Patented May 4, 1948

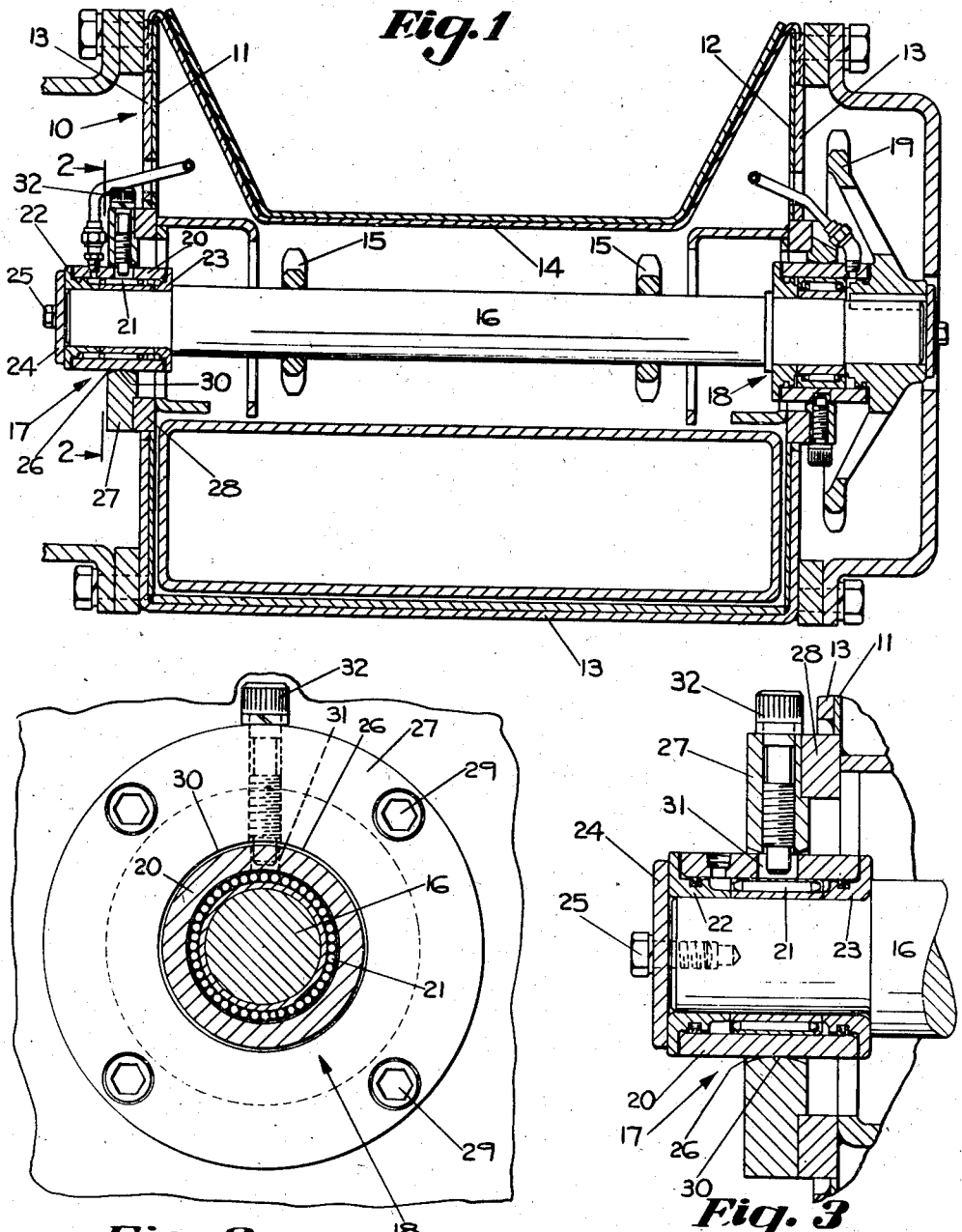

2,440,720

UNITED STATES PATENT OFFICE 2,440,720

SELF-ALIGNING BEARING

Arthur L. Lee, Upper Arlington, Ohio, assignor, by mesne assignments, to The Jeffrey Manufacturing Company, a corporation of Ohio Application March 8, 1945, Serial No. 581,629

2 Claims. (Cl. 308—72)

This invention relates to a bearing and shaft assembly and an object thereof is to provide an improved shaft assembly including one or more shaft supporting bearings which are self-aligning and which are of very simple but efficient construction.

A further object of the invention is to provide a simplified mounting for a bearing casing or housing which will hold the casing or housing against radial movement preferably in all directions while providing a rolling bearing surface between the housing and support.

A further object of the invention is to provide a self-aligning bearing in which a casing and support, preferably in the form of a plate, have cooperating bearing surfaces providing relative rolling movement between them in which they contact over a radial arc of at least 90 degrees and preferably 180 degrees and in the most complete form of my invention they contact over substantially 360 degrees.

Other objects of the invention will appear hereinafter the novel features and combinations being set forth in the appended claims.

In the accompanying drawings,

Fig. 1 is a transverse sectional view of a loading machine incorporating the features of my invention;

Fig. 2 is a view taken on the line 2—2 of Fig. 1 looking in the direction of the arrows; and Fig. 3 is an enlarged sectional view of one of the bearings and mountings therefor.

This application is a continuation in part of my application Serial No. 530,361 for a Loading machine, filed April 10, 1944.

In my application above identified there is disclosed in considerable detail a loading machine which is adapted to gather and load material such as coal. In Fig. 1 of the drawings I have shown a frame 10 which is the main frame of the loading machine but insofar as the present invention is concerned it obviously may be the frame of any machine. The frame 10 includes a pair of laterally spaced side walls 11 and 12 which are interconnected by a U-shaped reinforcing member 13 the upright walls of which overlap the side walls 11 and 12 and are rigidly attached to them so that they form part of said side walls. Extending across the tops of said side walls 11 and 12 is a U-shaped pan or trough 14. As disclosed more in detail in my parent application, above identified, there is endless conveyor mechanism adapted to travel along the trough 14 which is driven from a pair of spaced sprockets 15 mounted on a drive shaft 16 which is journaled in spaced bearing assemblies 17 and 18. A drive sprocket 19 is keyed to one end of the shaft 16 to drive it and associated conveyor mechanism, which is not shown.

The features of novelty to which this invention relates are directed to the structure of the bearings 17 and/or 18 and associated supporting apparatus. Except for dimensional differences, the bearing assemblies 17 and 18 are of fundamentally similar construction and thus a detailed description of bearing 17 will be adequate for an understanding of both.

The bearing assembly 17 includes a generally cylindrical bearing housing, casing or shell 20 within which there is an anti-friction needle bearing 21 which is interposed between the interior surface of the housing or casing 20 and a reduced neck of the shaft 16. This, of course, provides an anti-friction support between one end of the shaft 16 and the casing or housing 20.

Extending into the casing 20 from opposite sides are closure collars 22 and 23 which are provided with appropriate felt grease seals and thereby provide a grease chamber for the anti-friction bearing 21. The bearing 21 and collars 22 and 23 are held on the reduced shank of the shaft 16 by a thrust washer 24 and screw 25, the latter being threaded into one end of the shaft 16. The outer surface of the casing or shell 20 is substantially cylindrical and it extends through a circular hole 26 provided in a removable upright plate 27 which is removably attached to an integral ring 28 of the side wall 11 by screws 29. When the parts are assembled as shown in the drawings the plate 27 becomes in effect a part of the side wall 11. To provide the self-aligning characteristic or feature of the bearing, the interior surface provided by the hole 26 in the plate 27 which acts as a bearing surface for the casing or shell 20 is of generally cylindrical configuration but is preferably modified from this cylindrical configuration in that it is given a curved or arcuate shape, thus providing a rolling bearing surface 30, as clearly illustrated in Fig. 3 of the drawings, so that there will be a rolling action between the exterior bearing surface of the casing 20 and the bearing surface 30 in response to any cyclic movement of the axis of the shaft 16 or the axis of the bearing 21. This rolling movement is, of course, limited and in actual practice misalignment of the bearings 17 and 18 would only be small and the limited rolling action of each of them would be adequate to take care of any such misalignment and thus prevent any binding or undue friction on the bearing 21. It is, of course, obvious that a similar action might be produced by putting a curved bulge on the casing or shell 20 and making the hole 26 truly cylindrical, allowing the bulge surface of the casing 20 to roll on the cylindrical surface of the plate 27. Such a bulge surface might generally be a segment of a sphere.

It is furthermore to be noted that looking at the contact between the bearing surface 30 and that on the housing 20 in a plane perpendicular to the axis of the shaft 16, for example as illustrated in Fig. 2, this bearing contact is over substantially 360 degrees. This is desirable and it is particularly desirable that the bearing surface be over 180 degrees. The 360 degree bearing surface, of course, prevents any rattling of the casing 20 in the hole 26 and confines it against radial movement in all directions. In a case where it may be desirable to permit free radial movement in one direction the bearing surface may be limited to substantially 180 degrees or even as low as 90 degrees. Such an arrangement might be useful, for example, in idler supports for belt conveyors and the like, one illustration being my application, Serial No. 581,630, filed March 8, 1945, for a belt conveyor.

In order to prevent an undesirable amount of end creepage of the casing 20 with respect to the plate 27, said casing 20 is provided with an elongated groove or slot 31 which receives the projected nose of a lock screw 32 which is threaded through a threaded radial bore in the plate 27. As previously mentioned, the structure of the bearing 18 and associated supporting parts are similar to the structure of the bearing 17 and associated supporting parts, except for certain differences in size and other differences such as occasioned by the presence of the sprocket 19. Functionally the bearing 18 and associated supporting plate operates substantially identically with bearing 17 and associated plate 27, thus it requires no detailed description.

In the operation of the self-aligning bearings 17 and 18, as the shaft 16 rotates it will produce a cyclic reciprocation or possibly rotation of the axes of the bearings 17 and 18 in case there is any misalignment between said axes, which is frequently encountered in apparatus of the above described type. This cyclic reciprocation or rotation of the axes will be accommodated without any undue friction or binding on the associated anti-friction bearings, such as a bearing 21, by the movement of the casings or housings, such as casing 20, in their supporting plates, such as plate 27. This cyclic movement of the casings is freely provided by the cooperating rolling action between the bearing surfaces on the plates and on the housings, such as the bearing surface 30 on plate 27 and the cylindrical bearing surface provided on the exterior housing 26. At the same time undesirable axial movement of the bearings 17 and 18 is prevented by lock screws, such as lock screw 32, there being a similar lock screw for bearing 18.

As clearly illustrated in Fig. 1 of the drawings it is to be particularly noted that this is a very simple but highly efficient self-aligning bearing particularly in that the plate 27 is merely a flat plate of commercial thickness and the only machined part is the curved bearing surface 30 provided adjacent the opening 26.

It may be noted that as viewed in a plane through its axis, as illustrated in Fig. 3 of the drawings, the surface 30 is preferably a segment of a convex arc of a circle though it need not be strictly of such configuration so long as it provides the rolling action above described.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

1. A self-aligning bearing for supporting a rotating shaft including in combination a cylindrical housing, an anti-friction bearing in said cylindrical housing adapted to receive a shaft, means forming closure collars, one of said collars extending into each end of said cylindrical housing and abutting said anti-friction bearing for positioning it with respect to said cylindrical housing, each of said collar means including a surface adapted to abut an end of said cylindrical housing for arresting relative rectilinear movement of the bearing and cylindrical housing, one of said collar means co-operating with said cylindrical housing to form a lubricant chamber adjacent said anti-friction bearing, a lubricant seal means disposed at each side of said anti-friction bearing between the collar means and said cylindrical housing, means for introducing lubricant into said lubricant chamber and bearing, relatively thin plate means supporting said cylindrical housing, said plate means having a circular opening therein provided with an interior surface which is curved convexly as viewed in section in a plane through its axis whereby said bearing housing and relatively thin plate may have rolling action relative to each other, the bearing housing including an elongated slot, and a locking screw carried by said plate means extending into said slot holding said plate and bearing housing against relative rotation and against unlimited relative rectilinear movement.

2. A self-aligning bearing for supporting a rotating shaft including in combination a cylindrical housing, an anti-friction bearing in said cylindrical housing adapted to receive a shaft, means forming closure collars, one of said collars extending into each end of said cylindrical housing and abutting said anti-friction bearing for positioning it with respect to said cylindrical housing, each of said collar means including a surface adapted to abut an end of said cylindrical housing for arresting relative rectilinear movement of the bearing and cylindrical housing, relatively thin plate means supporting said cylindrical housing, said plate means having a circular opening therein provided with an interior surface which is curved convexly as viewed in section in a plane through its axis whereby said bearing housing and relatively thin plate may have rolling action relative to each other, the bearing housing including an elongated slot, and a locking screw carried by said plate means extending into said slot holding said plate and bearing housing against relative rotation and against unlimited relative rectilinear movement.

ARTHUR L. LEE.

REFERENCES CITED

The following references are of record in the file of this patent:

UNITED STATES PATENTS

| Number | Name | Date |
|---|---|---|
| 1,660,939 | Snow | Feb. 28, 1928 |
| 1,671,701 | Coats | May 29, 1928 |
| 1,755,637 | Eames | Apr. 22, 1930 |
| 1,816,474 | Eaton | July 28, 1931 |
| 1,824,959 | Knowlton | Sept. 29, 1931 |
| 2,061,758 | Eastman | Nov. 24, 1936 |
| 2,103,465 | Kinzie | Dec. 28, 1937 |

FOREIGN PATENTS

| Number | Country | Date |
|---|---|---|
| 270,189 | Great Britain | May 5, 1927 |
| 372,146 | Germany | Mar. 22, 1923 |